United States Patent [19]

Bonnet

[11] Patent Number: 5,368,240
[45] Date of Patent: Nov. 29, 1994

[54] APPARATUS FOR REDUCING RUBBER TO PARTICLES

[75] Inventor: Olivier Bonnet, Berlin, Germany

[73] Assignee: UBD Patent - und Lizenzverwaltungsgesellschaft, Berlin, Germany

[21] Appl. No.: 91,726

[22] Filed: Jul. 15, 1993

Related U.S. Application Data

[63] Continuation of Ser. No. 780,471, Oct. 22, 1991, abandoned.

[30] Foreign Application Priority Data

Oct. 23, 1990 [DE] Germany ............... 4033599

[51] Int. Cl.$^5$ ................ B02C 23/18; B02C 13/18; B02C 23/10
[52] U.S. Cl. ......................... 241/41; 241/62; 241/65; 241/69; 241/154; 241/DIG. 31; 241/DIG. 37; 241/DIG. 38
[58] Field of Search ............ 241/18, 23, 41, 62, 241/65, 69, 83, 152.2, 154, DIG. 31, DIG. 37, DIG. 38; 62/63, 374

[56] References Cited

U.S. PATENT DOCUMENTS

| | | | |
|---|---|---|---|
| 1,048,869 | 12/1912 | Pitcairn | 241/154 X |
| 2,126,776 | 8/1938 | Hogg | 241/152.2 X |
| 3,101,757 | 8/1963 | Hanson | 62/374 |
| 3,345,828 | 10/1967 | Klee et al. | 62/374 X |
| 3,376,710 | 4/1968 | Hirtensteiner | 62/63 X |
| 3,413,818 | 12/1968 | Pelmulder | 62/63 |
| 3,485,055 | 12/1969 | Webster et al. | 62/63 |
| 3,527,414 | 9/1970 | Schorsch | 241/65 X |
| 3,718,284 | 2/1973 | Richardson | 241/65 X |
| 3,771,729 | 11/1973 | Frable | 241/23 X |
| 3,889,488 | 6/1975 | Maeda et al. | 62/374 X |
| 3,992,899 | 11/1976 | Spahn | 241/DIG. 31 X |
| 4,020,992 | 5/1977 | Binger et al. | 241/65 X |
| 4,229,947 | 10/1980 | Klee | 62/374 |
| 4,340,076 | 7/1982 | Weitzen | 241/65 X |
| 4,403,479 | 9/1983 | Rasovich | 62/63 |
| 4,469,332 | 9/1984 | Brosdetzko et al. | 241/179 X |
| 4,783,972 | 11/1988 | Tyree, Jr. et al. | 62/374 |
| 4,813,614 | 3/1989 | Moore et al. | 241/65 X |
| 4,852,358 | 8/1989 | Acharya et al. | 62/63 |

FOREIGN PATENT DOCUMENTS

| | | | |
|---|---|---|---|
| 3915984 | 9/1990 | Germany . | |
| 46-26580 | 8/1971 | Japan | 241/152.2 |

Primary Examiner—Rinaldi I. Rada
Assistant Examiner—Clark F. Dexter

[57] ABSTRACT

Apparatus for reducing to particles scrap rubber, consisting of an inclined pre-cooling tunnel (11) comprising a conveying means (27) and adapted to be charged via a feed shaft (13), a main cooling tunnel (12) filled, at least in part, with a cooling medium (38) and provided with a conveyor means (41) and a size reduction device (46) downstream of the main cooling tunnel (12). The main cooling tunnel (12) and the pre-cooling tunnel (11) are interlinked via at least one gasification pipe (48) conveying a cooling medium.

12 Claims, 4 Drawing Sheets

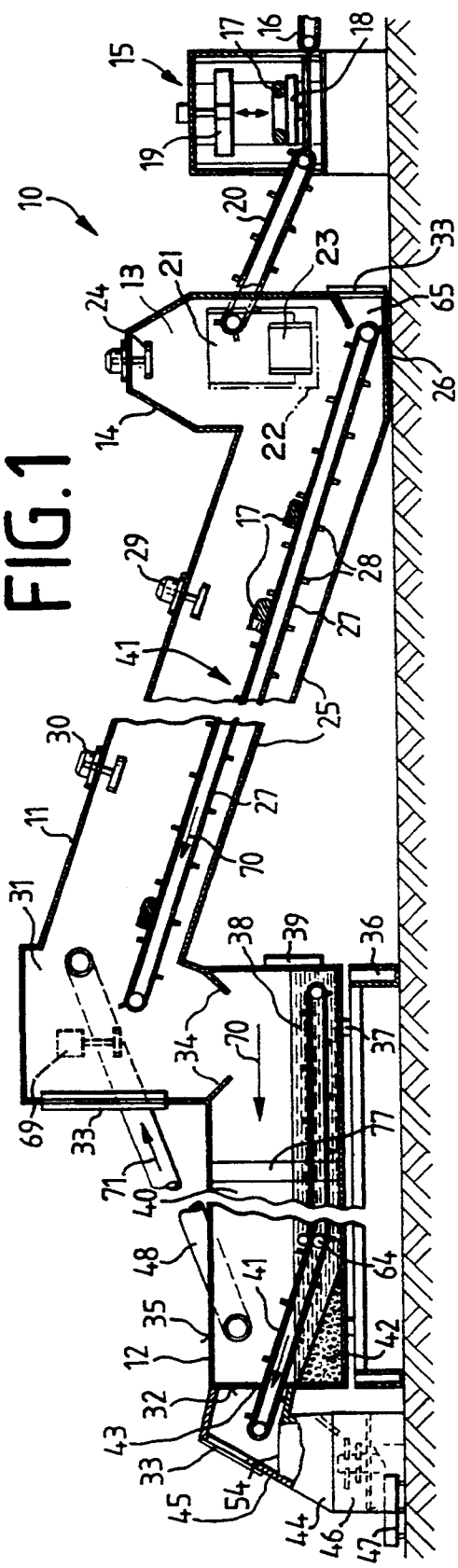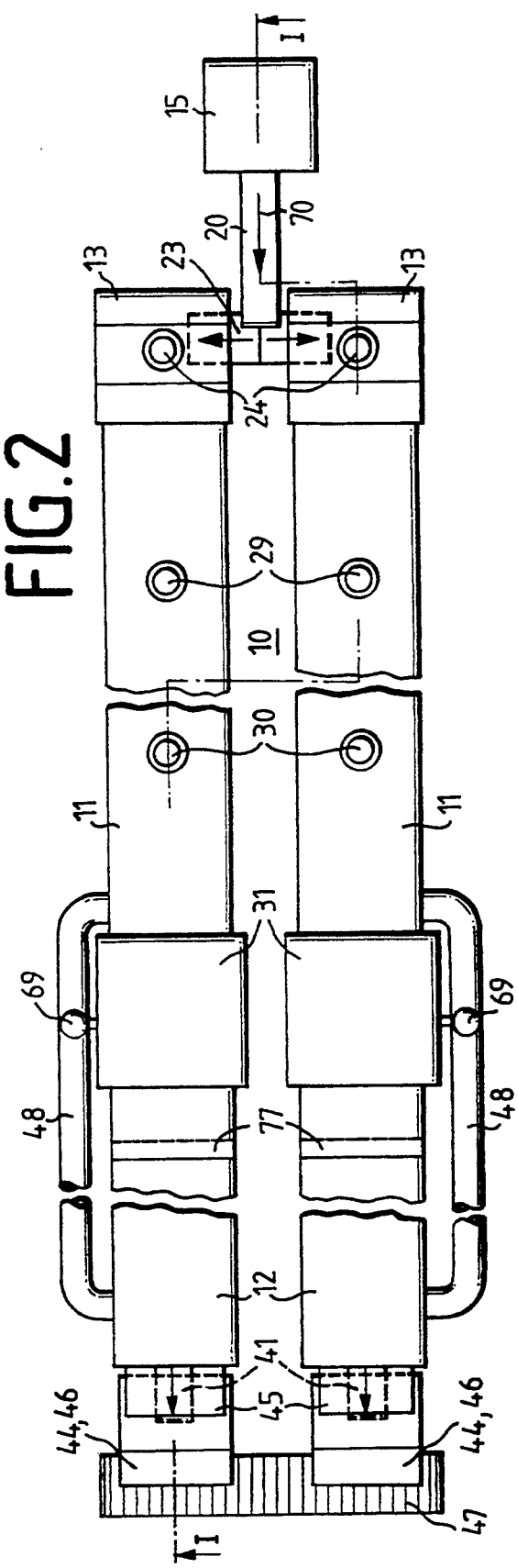

III-III

APPARATUS FOR REDUCING RUBBER TO PARTICLES

This application is a continuation of application Ser. No. 07/780,471 filed on Oct. 22, 1991, now abandoned.

BACKGROUND OF THE INVENTION AND PRIOR ART

The invention relates to an apparatus for reducing of rubber, in particular scrap rubber, scrap tires, rubber parts and rubber wastes, to particles, the apparatus comprising an inclined pre-cooling tunnel, comprising a conveyor means and adapted to be charged via a feed shaft, a main cooling tunnel, linked to the pre-cooling tunnel by a connection shaft, filled, at least in part, with a cooling medium and provided with a conveyor means and a crusher means downstream of the main cooling tunnel.

The purpose of such a plant, as disclosed, for example, in DE 39 15 984 C1, is to dispose of scrap rubber, namely to recycle it. The problem is that rubber in the form of fully vulcanized caoutchouc is not plastified by heating but becomes charred instead.

Scrap rubber also occurs in large quantities in the form of car tire carcasses which can no longer be retreaded. Such scrap tires present a considerable disposal problem and, in the disposal by incineration generally applied to date, generate a large amount of toxic waste gases which in turn have to be disposed of by suitable filter plants.

A further problem arises from the textile or metallic reinforcements incorporated in the carcasses. Scrap rubber, according to the known process, is to be converted into reusable material by way of granulating and is thus to be reprocessed into a new product. For this purpose, the elastic scrap rubber, with the aid of a cooling medium, namely liquid nitrogen, is cooled down to very low temperatures, approximately −140° C., causing it to embrittle, whereafter it can be ground. A problem of the known process arises from having to cool and embrittle the scrap tires to be reduced right into the innermost region thereof. For this purpose a sufficiently long exposure of the scrap tires to the cooling medium is required. At the same time a satisfactory conveyance of the slowly cooling tires, must be ensured in order to eliminate heating by friction.

GENERAL DESCRIPTION OF THE INVENTION

It is an object of this invention to provide an apparatus of a type described in the opening paragraph, which ensures a good thorough cooling combined with a continuous conveyance of the scrap rubber to be broken down.

The present invention provides an apparatus as set out in the opening paragraph, wherein the main cooling tunnel and the pre-cooling tunnel are interlinked via at least one gasification pipe conveying a cooling medium. These measures bring about that the cooling medium released into the main cooling tunnel by gasification is conveyed in counter current against the conveying flow of the scrap rubber to be broken down into the region of the feed shaft. The scrap rubber parts fed into the feed shaft are introduced here at this lowest point of the apparatus into a relatively cold atmosphere and can, until they are passed into the main cooling tunnel, be cooled down considerably further. Such cooling off may result already in temperatures of approximately −80° C. to −140° C.

Loss of cold energy is preferably to be avoided for an economic operation of the apparatus. For this purpose the invention may provide that the feed shaft of the pre-cooling tunnel is tightly covered by a closure dome and that a suction fan, by means of which humid air entering together with the rubber parts can be sucked out, is associated with the dome and that the feed shaft comprises a feed aperture through which the pre-cooling tunnel is fed by way of a swing flap which is closeable, at least in part, by a closing means. These measures, during frictionless transport, ensure at the same time a continuously progressing cooling down of the scrap rubber parts to be broken down.

In order to be able to reduce to a minimum the required quantity of a cooling medium, namely liquid nitrogen, a preferred feature provides that the interior of the main cooling tunnel is restricted in width by lateral partition walls and below the deflection of the conveyor means by a free space restriction and that the free space thus partitioned off is filled with insulating backfillings.

In order to provide cold bridges through the mountings of the tunnel pipes, themselves insulated against refrigeration losses, it is preferred that the pre-cooling tunnel and the main cooling tunnel comprise sturdy tunnel walls and that the sturdy tunnel walls are slidably mounted-on tunnel bearings. These measures prevent a direct connection between the inner pipe, conveying the cooling medium, of the main cooling tunnel and the pre-cooling tunnel and the outer atmosphere. Due to cooling effects, a volume contraction may occur in the pipes of the cooling tunnels which may amount to 20 to 30 mm, taken over the entire length- In order to prevent rupturing of the tunnel pipes due to this volume contraction, it is provided that the tunnel walls are mounted on slidable plastics material, and it is further provided that the main cooling tunnels comprise means for compensating for length variations.

In order to prevent solid freezing of movable components in the cooling medium, a preferred feature provides that the conveyor means passes from the cooling means charge via a deflection and through a discharge opening, sealed against outside air by an air lock system in a face end from the interior of the main cooling tunnel. This prevents the entry of humidity and avoids solid freezing. Furthermore, in order to obtain better insulation, the pre-cooling tunnel and the main cooling tunnel are provided with a vacuum insulation.

Further advantageous measures are described in the subsidiary claims. The invention is illustrated by way of a working example in the accompanying drawing and is described hereafter in more detail.

BRIEF DESCRIPTION OF THE DRAWINGS

There is shown in:

FIG. 1 the side elevation of an apparatus according to the invention, in section along the line I—I according to FIG. 2, with an inclined pre-cooling tunnel comprising an upstream cutting means and horizontally disposed main cooling tunnel comprising a downstream crusher means, FIG. 2 the plan view of an apparatus according to FIG. 1;

DETAILED DESCRIPTION OF SPECIFIC EMBODIMENTS

Figure 3:
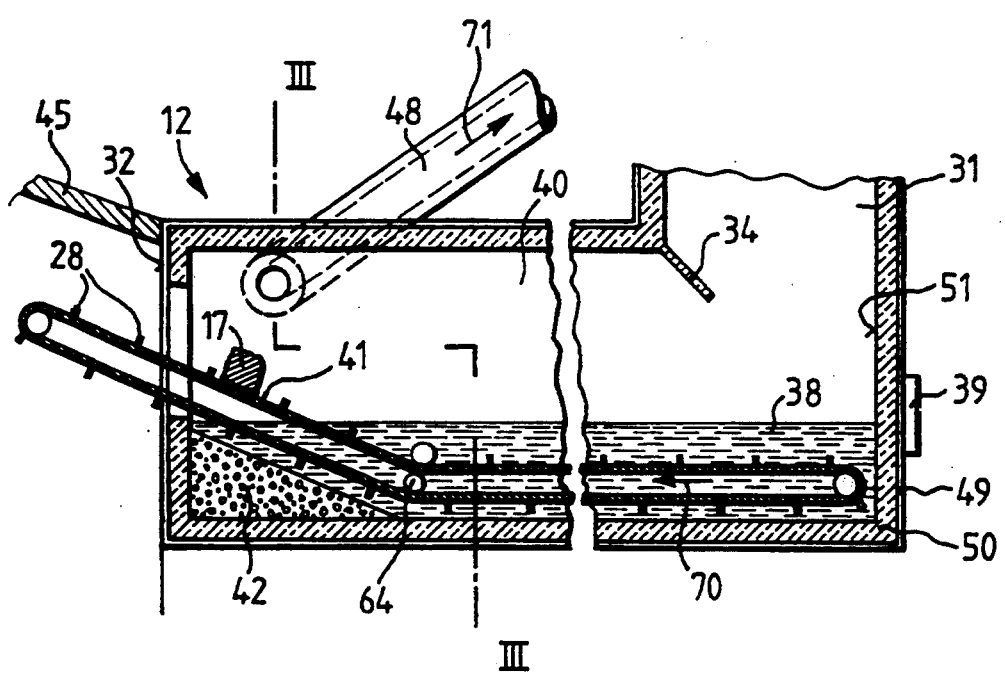
FIG. 3 the longitudinal section through a main cooling tunnel according to FIG. 1.

The following description is by way of specific example and should be read against the background of the aforegoing more general description.

The recycling apparatus 10, schematically illustrated in FIGS. 1 and 2, comprises essentially a tubular pre-cooling tunnel 11 and a main cooling tunnel 12 downstream of the pre-cooling tunnel 11. Upstream of the pre-cooling tunnel 11 a cutting means 15 is provided which, via a conveyor belt 16 may be fed with the recycling material 17 to be granulated, for example scrap tires.

The cutting means 15 comprises a punching table 18, onto which the recycling material 17 from the feed conveyor belt 16 is deposited and pre-reduced into pieces about as big as the palm of the hand by a descending punching blade 19. The recycling material 17 thus cut down by the cutting means 15 is successively fed by a feeding belt 20, accommodated below the punching table 18 into conveying direction 70 (arrow), to a feed shaft 13, provided above a bottom region 65 of the pre-cooling tunnel 11.

As is shown in FIG. 2, two parallel running recycling apparatus 10 are provided for a better capacity utilization which may be charged alternatingly by the cutting means 15. A distributor, for example in the form of a swing flap 23, which, controlled by computer, distributes the arriving recycling material 17, is associated with the feeding belt 20 in the region of the parallel feed shafts 13. The feed shafts 13 comprise lateral feed apertures 21, which, in order to prevent refrigeration losses, are provided with a curtain 22, for example a chain curtain or a lock flap.

Each feed shaft 13 is closed on top by a closure dome 14. A suction fan 24 is provided in the closure dome 14 which sucks out humid air which might have entered from the bottom region 65 of the pre-cooling tunnel 11.

The pre-cooling tunnel 11 consists of a solid outer tunnel wall 25, for example a steel pipe, which is slidably mounted on a sliding bearing 26, to compensate for volume contraction caused by the refrigeration. In other words, the sliding bearing 26 supports the end of the pre-cooling tunnel so that it may slide back and forth in response to temperature changes. In the interior of the pre-cooling tunnel 11 a conveyor 27 is provided, for example a chain conveyor of V2A-steel or a wire netting conveyor belt, provided with conveyor flights 28. The pre-cooling tunnel 11, starting from the bottom region 65, is disposed upwardly inclined towards a connection shaft 31, accommodated above the main cooling tunnel 12.

Above the conveyor 27 a plurality of fans 29 and 30 are disposed in the pre-cooling tunnel 11, whirling around the cold air emanating from the main cooling tunnel 12 through the gasification pipes 48 and conveying it towards the bottom region 65. Supported by the suction fans 24 in the closure domes 14 a circulating cooling medium gas thus develops which, in counter-current, flows against the upwardly conveyed recycling material 17. The recycling material 17 entering into the bottom region 65 of the pre-cooling tunnel 11 at room temperature is thus precooled to approximately $-80°$ C. to $-140°$ C. on its way to the connection shaft 31.

The recycling material 17 precooled in this way is passed in the connection shaft 31 to the main cooling tunnel 12, where it drops into a cooling medium 38 via baffles 34. The filling level of the cooling medium 38 is regulated with the aid of a filling level indicator 39. The cooling medium 38, for example liquid nitrogen, has a temperature of approximately $-195°$ C. The recycling material 17, entering at $-80°$ C. to $-140°$ C. is relatively warm in comparison, causing it to boil up by its immersion into the substantially colder cooling medium 38, i.e. with gasification of nitrogen. The gaseous nitrogen is passed via the gasification pipes 48 from the main cooling tunnel 12, approximately in the region of the connection shaft 31, into the pre-cooling tunnel 11.

This causes a cooling medium-gas flow 71 to develop which proceeds in the direction of the bottom region 65. This cooling medium gas flow 71 may be promoted by fans 69, disposed in the gasification pipes 48 and directionally stabilised.

The main cooling tunnel 12 consists likewise of a sturdy outer tunnel wall 35 and is essentially horizontally disposed. It is slidably mounted on a tunnel bearing 37 which in turn rests on a cooling tunnel support 36. In this regard, due to the extreme coldness caused by the nitrogen in the tunnel and of the weight of the whole system, there could be contractions of the material of the tunnel. To compensate for this, the tunnel bearing 37 is used. For compensating the temperature-induced length variations a compensating means for length variations 77 is provided in which the main cooling tunnel 12 may change its length. The connection shaft 31 is provided with a tightly closing man hole 33 through which both the pre-cooling tunnel 11 and the main cooling tunnel 12 are accessible.

In the interior 40 of the main cooling tunnel 12 a conveyor means 41, for example a chain conveyor belt of V2A-steel is disposed, provided with flights 28. The introduced recycling material 17 is immersed completely into the cooling medium 38 and is cooled down to its core to approximately $-120°$ C. to $-190°$ C. whilst moving in the conveying direction 70 (arrow).

The conveyor means 41 runs essentially horizontally in the cooling medium 38. In the region of the face end 32, opposite the connection shaft 31, the conveyor means 41 comprises a deflection 64 and proceeds at first upwardly inclined from the cooling medium 38 and hence through a discharge aperture 43 from the interior 40 of the main cooling tunnel 12. For distribution onto downstream crusher means 46, disposed in pairs, the now deeply chilled recycling material 17 is thereafter passed to a tubular Y-fitting 44.

Figure 4:
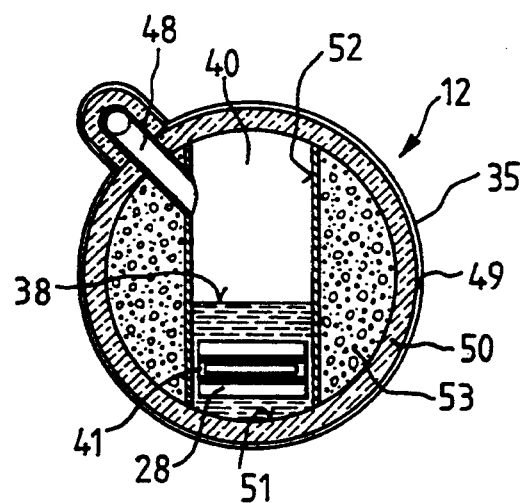
FIG. 4 the cross-section through a main cooling tunnel along the line III—III according to FIG. 3.

As is shown in FIG. 4, essentially vertically disposed lateral partition walls 52 are provided in the main cooling tunnel 12 on either side of the conveyor means 41. These partition walls 52 reduce the interior 40 of the main cooling tunnel 12 by the dead space which occurs due to the tubelike tunnel diameter and which is basically not required. This dead space is backfilled with a backfilling 53 consisting of insulation material. The quantity of the cooling medium 38 required, representing a considerable cost factor, can thus be substantially reduced.

Opposite the outer tunnel wall 35 the interior 40 of the main cooling tunnel 12 is insulated by an insulation 50 which is provided with a vacuum insulation 49 on the outside. The inside of the insulation 50 comprises an inner coating 51, resistant against the cooling medium 38.

As is further shown in FIG. 3, a free space restriction 42 is provided below the deflection 64 of the conveyor means 41, likewise reducing the quantity of cooling medium 38 required for filling the main cooling tunnel.

In order to prevent reheating of the chilled recycling material 17 during discharge from the main cooling tunnel 12 through the discharge aperture 43, a cold-insulating cover 45 is provided above the Y-piece 44.

Figure 5:
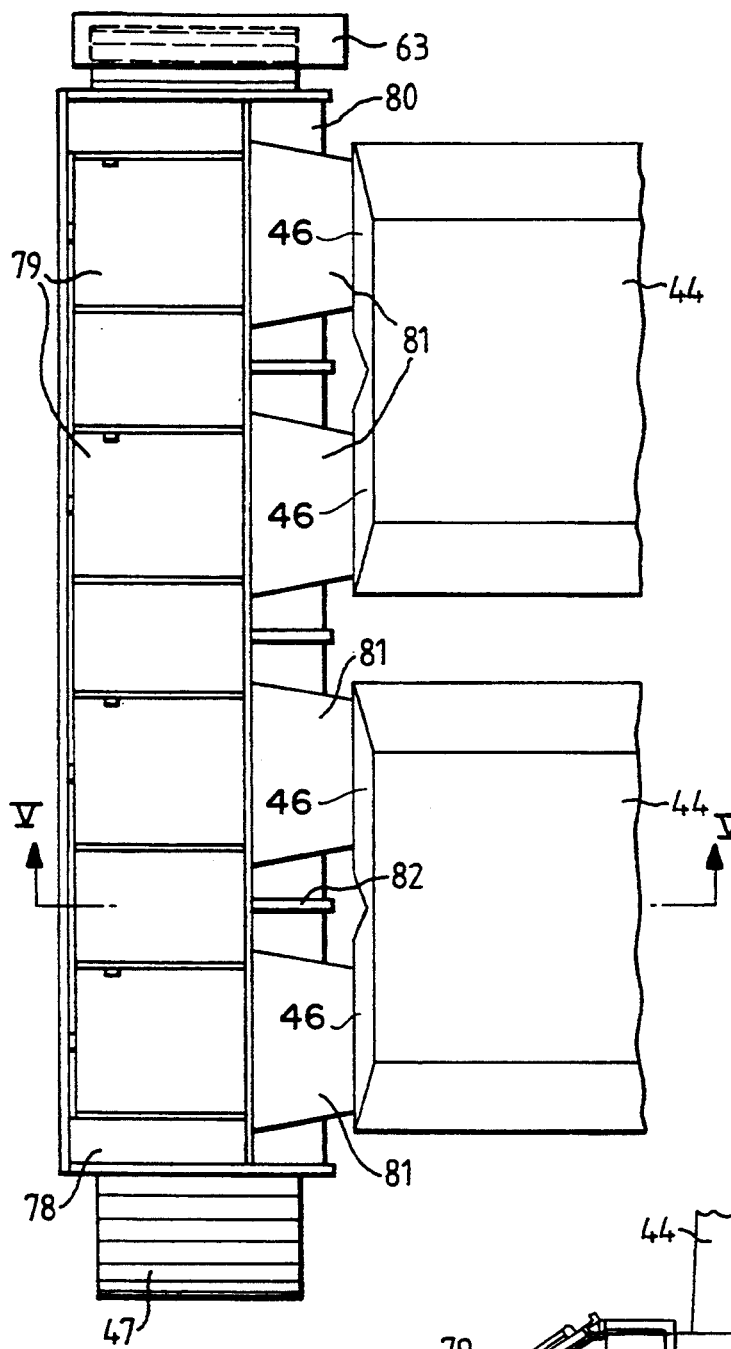
FIG. 5 the plan view of a crusher means with associated discharge conveyor belt, conveyor belt cover comprising inspection lids and magnetic belt separator means.
Figure 6:
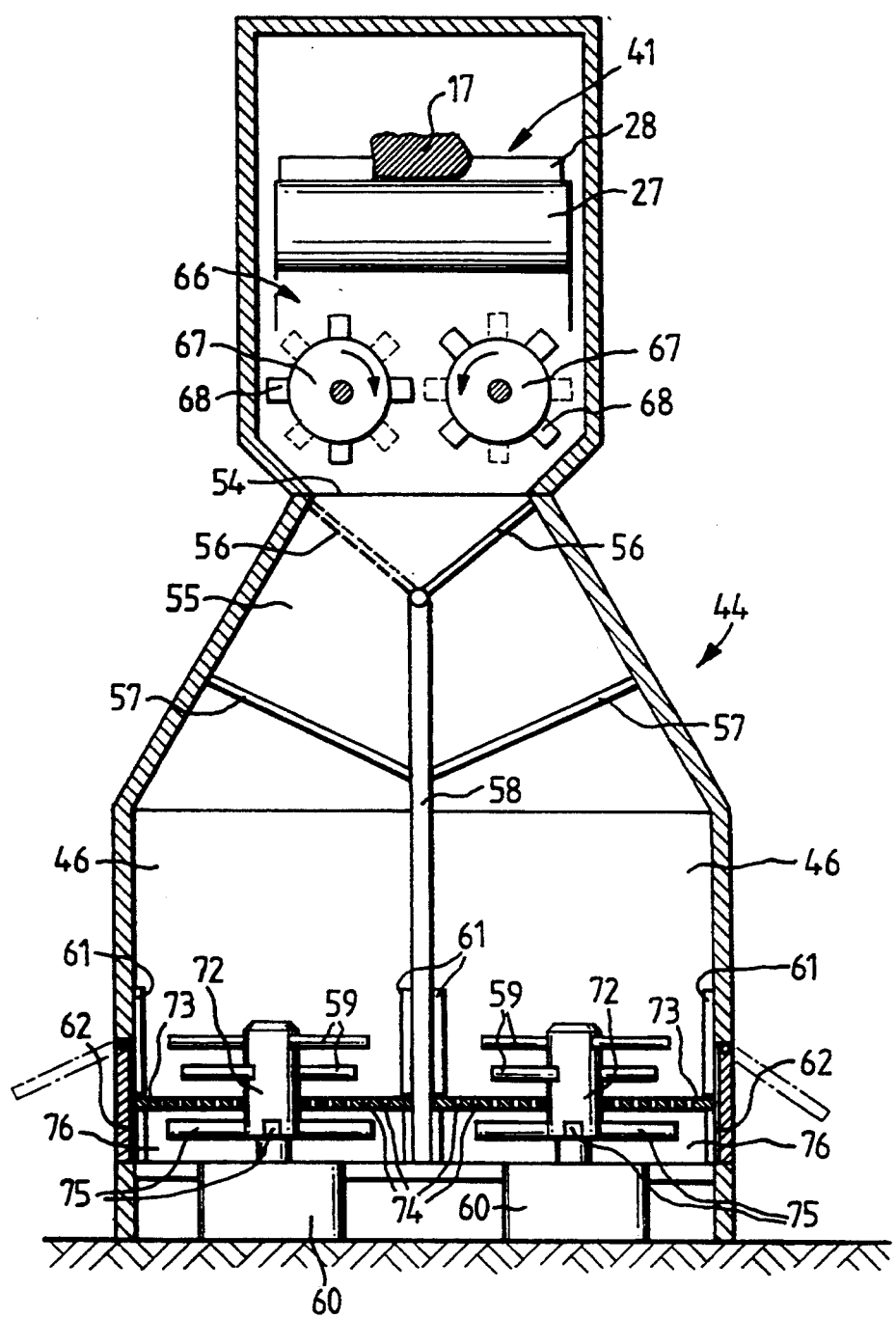
FIG. 6 the schematic illustration of a double crusher means with sieve bottoms and fine grinding chambers.

As is shown in FIG. 5, two crusher means 46 are associated with each of the main cooling tunnels 12, disposed in pairs. These crusher means 46 are each fed through a Y-piece 44, as illustrated in detail in FIG. 6. For this purpose a Y-piece 44 has a feed aperture 54 through which the deeply chilled recycling material 17 can enter the crusher means 46. In order to prevent refrigeration loss, an air lock system is provided in the region of the feed aperture 54, consisting of an upper air lock flap 56 and a lower air lock flap 57. The lock flaps 57 are disposed in pairs and by way of computer-control feed the crusher means 46, likewise disposed in pairs.

The air lock system 55 simultaneously prevents the entry of humid outside air. This avoids the entry of water into the cooling tunnels 11 and 12, because water can lead to solid freezing of the movable parts, for example the conveyor means 27 and 41. In order to reduce the volume of the Y-pieces 44, partition walls 58 are provided in the air lock system 55, which are disposed essentially horizontally.

Cam or roller crushers 66 may be disposed above the feed apertures 54 by means of which the deeply chilled recycling material 17 may be pre-reduced before it enters the crusher means 46 for grinding. The cam crushers 66 comprise crusher rollers 67 armed with crusher projections 68.

Rotatable hammer bars 59 are provided in the crusher means 46 to which rotary movement may be imparted by a hammer bar drive means 60. For example an electric motor may serve as the hammer bar drive means 60. On the inner wall of a crusher means 46 stationary impact bars 61 are disposed which, in coaction with the hammer bars 59 break down the input of recycling material 17. The hammer bars 59 are disposed staggered levelwise and angularly by 90° each around the pivotal axis 72. In order to attain as fine as possible a grinding action, the crusher means 46 comprise sieve bottoms 73, having a plurality of apertures 74. Below these sieve bottoms 73 fine cutting impact bars 75 are provided, which rotate in the fine grinding chambers 76, likewise provided below the sieve bottoms 73. In this way, the recycling material 17 having reached the fine grinding chambers 76 below the sieve bottoms 73 through the apertures 74, are ground even more intensively and consequently finer.

Textile or metallic reinforcement components are also released during grinding, which are usually present in scrap tires. The crusher means 46 can be emptied through a discharge aperture 62. From the discharge apertures 62 the recycling material 17, now ground and granulated into a relatively wide ranging particle size fraction, drops onto a discharge conveyor belt 47, above which a magnetic belt separator 63 is disposed.

To begin with, the metallic reinforcement components are separated with the aid of the magnetic belt separator 63. The recycling material 17 precleaned in this way is sieved and classified by a separation means, not shown in detail. In this context also the relatively finely reduced textile reinforcement components are separated and the ground recycling material 17 is divided into differently sized fractions and subsequently filled for further processing.

Figure 5A:
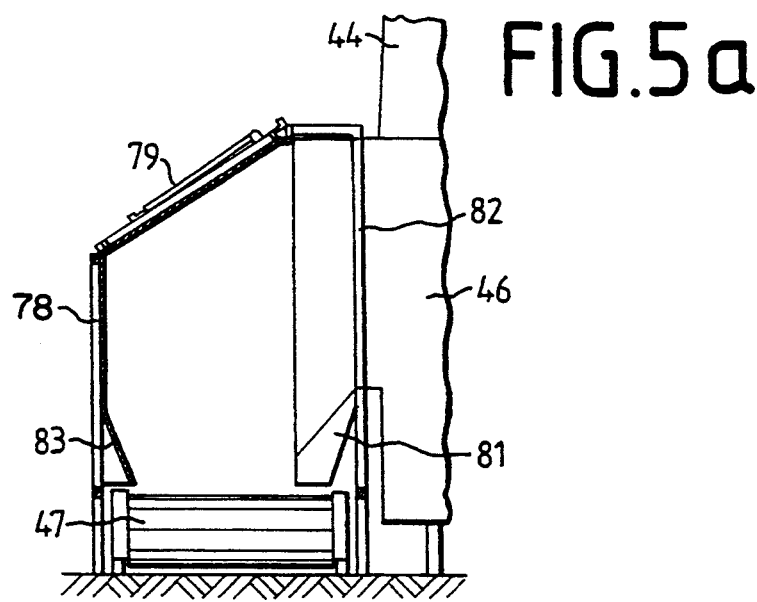
FIG. 5a the section through the conveyor belt cover with inspection lids along the line V—V according to FIG. 5.

As is shown in FIGS. 5 and 5a, the discharge conveyor belt 47 is provided with a conveyor belt cover 78. In order to provide access to the discharge apertures 62 of the crusher means 46, the conveyor belt cover 78 comprises access lids 79. The conveyor belt cover 78 comprises a rear wall 80 facing the Y-pieces 44, provided with a plurality of reinforcements 82. Between the discharge apertures 62 of the crusher means 46 and the conveyor belt cover 78 chutes 81 are each provided. The conveyor belt cover 78 is provided with front restrictions 83 for laterally restricting the discharge onto conveyor belt 47. At the rear end, viewed in the conveying direction, a magnetic belt separator 63 is provided over the discharge conveying belt 47 by means of which metallic components can be extracted from the ground recycling material 17.

What we claim is:

1. An apparatus for reducing rubber to particles comprising an inclined pre-cooling tunnel including a conveying means for conveying material through the pre-cooling tunnel to a connection shaft; said pre-cooling tunnel charged at an Upstream end via an enclosed feed shaft connected to said pre-cooling tunnel, a main cooling tunnel downstream of said pre-cooling tunnel and filled, at least in part, with a cooling medium and provided with a conveyor means for conveying said material through the main cooling tunnel and to; a crusher means for crushing said material, said crusher means being disposed; downstream of the main cooling tunnel, wherein said main cooling tunnel and said pre-cooling tunnel are connected by said connection shaft and are further interlinked via at least one gasification pipe means for conveying a cold air emanating from said main cooling tunnel to said pre-cooling tunnel.

2. The apparatus according to claim 1, wherein the main cooling tunnel is essentially horizontally disposed, the conveyor means provided in the main cooling tunnel runs, at least in part, in the cooling medium and at least one fan is positioned in the gasification pipe means provided between the main cooling tunnel and the pre-cooling tunnel.

3. The apparatus according to claim 1, wherein the feed shaft of the pre-cooling tunnel is covered by a closure dome and a suction fan is positioned within the dome.

4. The apparatus according to claim 1, wherein the feed shaft has a feed aperture through which the feed shaft is charged by way of a swing flap, wherein the feed aperture is selectively closed, at least partially, by a closing means.

5. The apparatus according to claim 1, further comprising an air lock system and wherein the conveyor means in said main cooling tunnel passes from the cooling medium and from the main cooling tunnel toward the crusher means through an opening in the main cooling tunnel said air lock system being disposed between said opening and the crusher means.

6. The apparatus according to claim 1, wherein the interior of the main cooling tunnel is restricted in width by lateral partition walls disposed within walls of the main cooling tunnel forming a free space between respective partition walls and main cooling tunnel walls, and said interior being further restricted below a deflection of the conveyor means by a free space restriction which is a free space partitioned off between the conveyor means and a bottom portion of the main cooling tunnel, and wherein the free spaces are filled with insulating backfillings.

7. The apparatus according to claim 1, wherein each of the pre-cooling tunnel and the main cooling tunnel include a sturdy tunnel wall and the sturdy tunnel walls are slidably mounted on tunnel bearings, and the tunnel wall of the main cooling tunnel includes a compensating means for varying the length of the main cooling tunnel in response to temperature induced length variations.

8. The apparatus according to claim 1, further comprising an air lock system and a pre-milling means for preliminarily reducing said material from the main cooling tunnel wherein said main cooling tunnel has a discharge opening at a downstream end and said pre-milling means and said air lock system are disposed sequentially downstream of said discharge opening between the main cooling tunnel and the crusher means.

9. The apparatus according to claim 1, wherein the crusher means comprises at least one sieve bottom underneath which a fine cutting impact blade is provided rotating in a fine grinding chamber.

10. The apparatus according to claim 1, wherein the pre-cooling tunnel and the main cooling tunnel are provided with a vacuum insulation.

11. The apparatus according to claim 1, wherein the main cooling tunnel is provided with a means for compensating for length variations.

12. The apparatus according to claim 1, further comprising a pre-reduction assembly, the pre-reduction assembly being disposed upstream of said feed shaft and including cutting means for pre-reducing the rubber, and a feeding belt disposed between the pre-reduction assembly and the feed shaft.

* * * * *